United States Patent
Kuroda

(10) Patent No.: US 6,249,599 B1
(45) Date of Patent: Jun. 19, 2001

(54) METHOD AND APPARATUS FOR DETECTING TOOL TROUBLE IN MACHINE TOOL

(75) Inventor: Yoshiaki Kuroda, Ishikawa-ken (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/155,700

(22) PCT Filed: Apr. 23, 1997

(86) PCT No.: PCT/JP97/01407

§ 371 Date: Oct. 5, 1998

§ 102(e) Date: Oct. 5, 1998

(87) PCT Pub. No.: WO97/40959

PCT Pub. Date: Nov. 6, 1997

(30) Foreign Application Priority Data

Apr. 30, 1996 (JP) .................................... 8-108972
Apr. 30, 1996 (JP) .................................... 8-109047

(51) Int. Cl.[7] .................................................. G06K 9/00
(52) U.S. Cl. ............................................................ 382/152
(58) Field of Search ..................................... 382/141, 152, 382/170, 173, 194, 199, 216, 218; 250/559.04, 559.05, 559.46, 559.36; 702/34, 40, 172; 348/86, 128, 130; 356/69, 376, 237.2; 29/407.04; 407/12; 409/59, 96

(56) References Cited

U.S. PATENT DOCUMENTS

| | | | |
|---|---|---|---|
| 4,238,780 | * | 12/1980 | Doemens ..................... 340/146.3 H |
| 4,583,854 | * | 4/1986 | Lozar ................................. 356/237 |
| 4,637,054 | * | 1/1987 | Hashim .................................. 382/8 |
| 4,700,224 | * | 10/1987 | Miyasaka et al. ................... 358/101 |
| 4,845,763 | * | 7/1989 | Bandyopadhyay et al. ............ 382/8 |
| 5,226,095 | * | 7/1993 | Okumura et al. ...................... 382/48 |
| 5,333,208 | * | 7/1994 | Massen ................................... 382/8 |
| 5,483,604 | * | 1/1996 | Salisbury ............................. 382/152 |
| 5,926,558 | * | 7/1999 | Zelt, II et al. ....................... 382/100 |

FOREIGN PATENT DOCUMENTS

| | | |
|---|---|---|
| 61-111877 | 5/1986 | (JP) . |
| 61-128385 | 6/1986 | (JP) . |
| 61-252051 | 11/1986 | (JP) . |
| 61-293754 | 12/1986 | (JP) . |
| 63-47216 | 3/1988 | (JP) . |
| 1-33299 | 7/1989 | (JP) . |
| 6-39685 | 2/1994 | (JP) . |
| 8-47843 | 2/1996 | (JP) . |

* cited by examiner

*Primary Examiner*—Leo Boudreau
*Assistant Examiner*—Brian Werner
(74) *Attorney, Agent, or Firm*—Frishauf, Holtz, Goodman, Langer & Chick, P.C.

(57) ABSTRACT

In a machine tool for performing cutting work of a work employing a tool provided with at least one throw away tip, abnormality of the tip C can be certainly detected by picking up tips $C_1, C_2, \ldots C_n$ of the tool by means of image pick-up means 23, providing different image processes for the obtained image, obtaining a luminance value distribution data of an inspecting region set at a cutting edge portion of the tip, and performing interpolation processing between the images for the obtained luminance value distribution data to take out only a luminance value of a defective portion Cc of the inspecting region and to detect abnormality of the tip $C_1, C_2, \ldots C_n$ on the basis of the luminance value. Thus, abnormality of the tip C can be certainly detected even when a stain is deposited.

3 Claims, 12 Drawing Sheets

METHOD AND APPARATUS FOR DETECTING TOOL TROUBLE IN MACHINE TOOL

This application claims the priority of PCT/JP97/01407, published as WO97/40959.

TECHNICAL FIELD

The present invention relates to a method for detecting abnormality of a tool of a machine tool machining a work employing a cutting tool having at least one edge (throw away tip), and a system therefor.

BACKGROUND ART

Conventionally, in a cutting tool having a plurality of throw away tips, if chipping or abnormal wearing is caused even in one tip, vibration is inherently caused during machining of a work to thereby make it difficult to machine with high precision, and excessive load can be exerted on other normal tips to thereby cause chipping or abnormal wearing even in the normal tips.

Therefore, various detecting methods or detecting systems for detecting abnormality, such as chipping or so forth, caused during cutting work have been proposed in the prior art and put into practical use.

For example, in Japanese Unexamined Patent Publication No. Showa 61-111877 or Japanese Examined Patent Publication No. Heisei 1-33299, "Edge Chipping Detector" or "Abnormality Detecting Method of Cutting Tool" detecting a vibration caused at the occurrence of chipping of the edge during cutting work and thus detecting abnormality of the cutting tool, have been proposed.

On the other hand, in Japanese Unexamined Patent Publication No. Showa 61-252051, there has been proposed an "Edge Chipping Detecting System" optically detecting chipped edge by a signal from the edge detected by a photoelectric switch with an optical fiber and a signal from an edge mounting position detecting circuit.

Furthermore, in Japanese Unexamined Patent Publication No. Heisei 6-39685, there has been proposed a "Tool Damaging Detecting System of Cutting Tool" detecting wearing or chipping of an edge by means of an image pick-up means, such as an optical sensor, TV camera or so forth.

In the abnormality detecting method or the abnormality detecting system detecting abnormality of the edge from vibration caused by chipping or wearing of the edge as disclosed in the foregoing Japanese Unexamined Patent Publication No. Showa 61-111877 or Japanese Examined Patent Publication No. Heisei 1-33299, a drawback is encountered in that when a cutting amount is small such as in finish machining, the vibration caused when chipping of the edge occurs may only be slight, thereby making it difficult to detect abnormality of the edge.

On the other hand, in the cutting tool provided with a plurality of rows of edges, such as a turn broach, vibration caused due to abnormality of the edge is superimposed thereby/making it extremely difficult to identify the row in which abnormality of the edge is caused.

Therefore, a drawback is encountered in that when abnormality is detected, the damaged edge has to be visually found among several hundreds of edges, which requires a substantial work load in identifying the damaged edge.

On the other hand, in the abnormality detecting systems that optically detect abnormality of the edge by means of a photoelectric switch with an optical fiber or an image pick-up means as disclosed in Japanese Unexamined Patent Publication No. Showa 61-252051 or Japanese Unexamined Patent Publication No. Heisei 6-39685, a drawback is encountered in that since it is difficult to detect abnormality of a fine edge, when precision in detection is low and the system detects reflection light from the edge, it becomes impossible to detect abnormality for significant lowering of reflection index of the light when the surface of the edge is oxidized and blackened due to the heat generated during cutting work.

Also, there is a method which takes an image of each tip by means of the image pick-up means and makes judgement of abnormality of each tip by processing the image. In this method, accurate abnormality detection becomes impossible due to an error in the position on the screen as being subjected to the influence of thermal distortion for heat generation of the overall machine during machining of the work or as being influenced by error of the mounting position which may be caused upon re-mounting of the image pick-up means or the tool after removal for maintenance.

For this reason, in the prior art, the image of the tip taken by the image pick-up means is processed by pattern matching to perform position recognition to recognize the position of the tip on the screen. However, when the surface of the edge is oxidized and blackened by the heat generated during cutting work as set forth above, the following drawback is caused.

Normally, this type of overall tip C is colored by gold or the like. When cutting work is performed, a part of the edge is oxidized and blackened as shown in FIG. 1A due to the heat generated during cutting.

When the image of the tip C, the edge of which is blackened, is picked up by the image pick-up means and an inspecting region is set to the edge portion of the tip C, a normal portion Ca of the gold color and a blackened portion Cb are present in admixed fashion in the inspecting region.

On the other hand, when a defective portion Cc, due to chipping of the edge or so forth, is caused in the blackened portion Cb in the inspecting region, a raw metal of the tip C is exposed in the defective portion Cc. Therefore, a luminance distribution of the inspecting region becomes as shown in FIG. 1B to have an equivalent luminance value as the normal portion Ca in the defective portion Cc.

Here, when the lighting for picking-up of the image is weak, if abnormality is judged with a threshold value set at a position T1 of FIG. 1B, a drawback is encountered in that the normal portion Ca showing a higher luminance value than the threshold value T1 can be judged as being abnormal to make it impossible to accurately judge abnormality of the tool.

When the threshold value is set at a position T2 of FIG. 1B in order to prevent such defects, it can be avoided to judge the normal portion Ca as being abnormal. However, the number of extracted pixels having the luminance value exceeding the threshold value T2 of the defective portion Cc is reduced significantly. As a result, a drawback is encountered in that a fluctuation of the luminance value is caused due to fluctuation of lighting or stain depositing on the edge, and defective portion Cc cannot be recognized even when the defective portion Cc is caused in the inspecting region, to significantly lower accuracy of detection.

The present invention has been worked out for solving such drawbacks. And it is an object of the present invention to provide a tool abnormality detecting method for a machine tool which can accurately detect abnormality, such as chipping of the edge caused in an inspecting region of the tip and a tool abnormality detecting system for a machine tool which can recognize the position of each tip based on a reference mark taken together with an image of the tip.

SUMMARY OF THE INVENTION

In order to accomplish the above-mentioned object, in a machine tool for performing cutting work of a work employing a tool provided with at least one throw away tip, an abnormality of the tip can be detected on the basis of the luminance value by picking up tips of the tool by means of image pick-up means, providing different image processes for the obtained image, obtaining a luminance value distribution data of an inspecting region set at a cutting edge portion of the tip, and performing interpolation processing between the images for the obtained luminance value distribution data to take out only a luminance value of a defective portion Cc of the inspecting region.

One of the different image processes may be primary differentiation process and the other may be an averaging process.

By the method set forth above, even when a cutting edge of the tip is oxidized and blackened due to heat generated during cutting of the work and the normal portion and the blackened portion are present in the inspecting region set on the cutting edge in admixed fashion, the luminance value of only the defective portion can be taken out while making the luminance values of the blackened portion and the normal portion substantially zero by performing an interpolating operation between the images utilizing the fact that the density distribution is abruptly varied in the peripheral portion of the defective portion and the density distribution is moderately varied in the blackened portion and the normal portion. It is thus possible to precisely detect even a defect caused in the blackened portion.

By this, even when the cutting edge of the tip is blackened by heat or a stain is deposited on the cutting edge, a small abnormality caused on the cutting edge of the tip can be certainly detected. Therefore, it becomes possible to successfully prevent the occurrence of poor work due to abnormality of the tip. In conjunction therewith, since vibration or noise which can be caused due to abnormality of the tip can be eliminated, improvement of the work environment can be achieved.

On the other hand, since enlarging of a chip caused due to increasing of the cutting area of a next tip when one tip is broken can be avoided, disposal of the chip can be facilitated. As, a result, entwining of an enlarged chip on the work to further damage the tip can be avoided.

Also according to the present invention for a machine tool for performing cutting work of a work employing a tool provided with at least one throw away tip may comprise image pick-up means for picking up images of tips and at least one reference marker preliminary provided in the vicinity of the tip, means for selecting a corresponding tip pattern among the tip registration patterns by performing pattern matching processing of preliminarily registered tip registration patterns and reference markers, and the images of the tips and the reference markers picked up by the image pick-up means, means for setting an inspecting region by the positions of the reference marker of the selected chip pattern and the reference marker picked-up by the image pick-up means, and abnormality detecting means for detecting abnormality of the tip by image processing of the image where the inspecting region is set and making a judgement with respect to a degree of wearing or chipping.

With the construction set forth above, by causing emergency stop of the machine tool when abnormality of tip is detected, sequential breakage of other normal tips can be avoided.

On the other hand, even when the cutting edge of the tip is blackened by heat generated during cutting work, the inspecting region can be accurately set on the basis of the positions of the reference marker provided in the vicinity of the tip and the reference marker of the tip registration pattern. Also, abnormality of the cutting edge can be detected without being influenced by color variation or stain of the cutting edge of the tip.

By this, since even a small abnormality occurring on the cutting edge of the tip can be detected certainly, the occurrence of poor work due to abnormality of the tip can be successfully prevented. Also, since the vibration or noise generated due to abnormality of the tip can be eliminated, the work environment can be improved.

Furthermore, since enlarging of a chip caused due to increasing of the cutting area of a next tip when one tip is broken can be avoided, disposal of the tip can be facilitated. As a result, entwining of an enlarged tip on the work to further damage the tip can be avoided.

Also according to the present invention, a cleaning means for cleaning tip and so forth deposited on the reference marker M1, M2 provided in the vicinity of the tip may be provided.

In the foregoing construction, even when the chip generated during the cutting work is deposited on the reference marker, it becomes possible to clean it by the cleaning means. Therefore, the drawback in that the chip or so forth is deposited to make the position of the reference marker difficult to detect, can be avoided.

The reference marker provided in the vicinity of the tips may be located at a reentrant position from the surface of the tool.

By the construction set forth above, the reference is marker will never be erased or worn off by the chip or so forth generated during cutting. Thus, reliability can be improved.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

BEST MODE FOR IMPLEMENTING THE INVENTION

Figure 2:
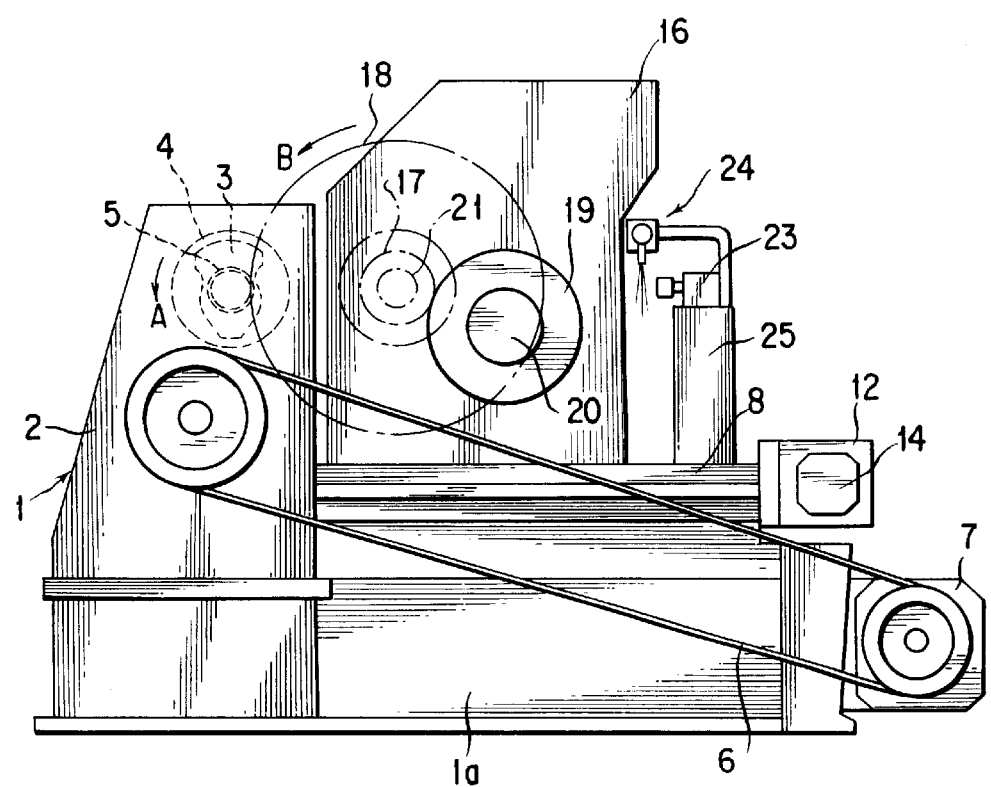
FIG. 2 is a side elevation of a machine tool employing the preferred embodiment of a tool abnormality detecting method according to the present invention.
Figure 4:
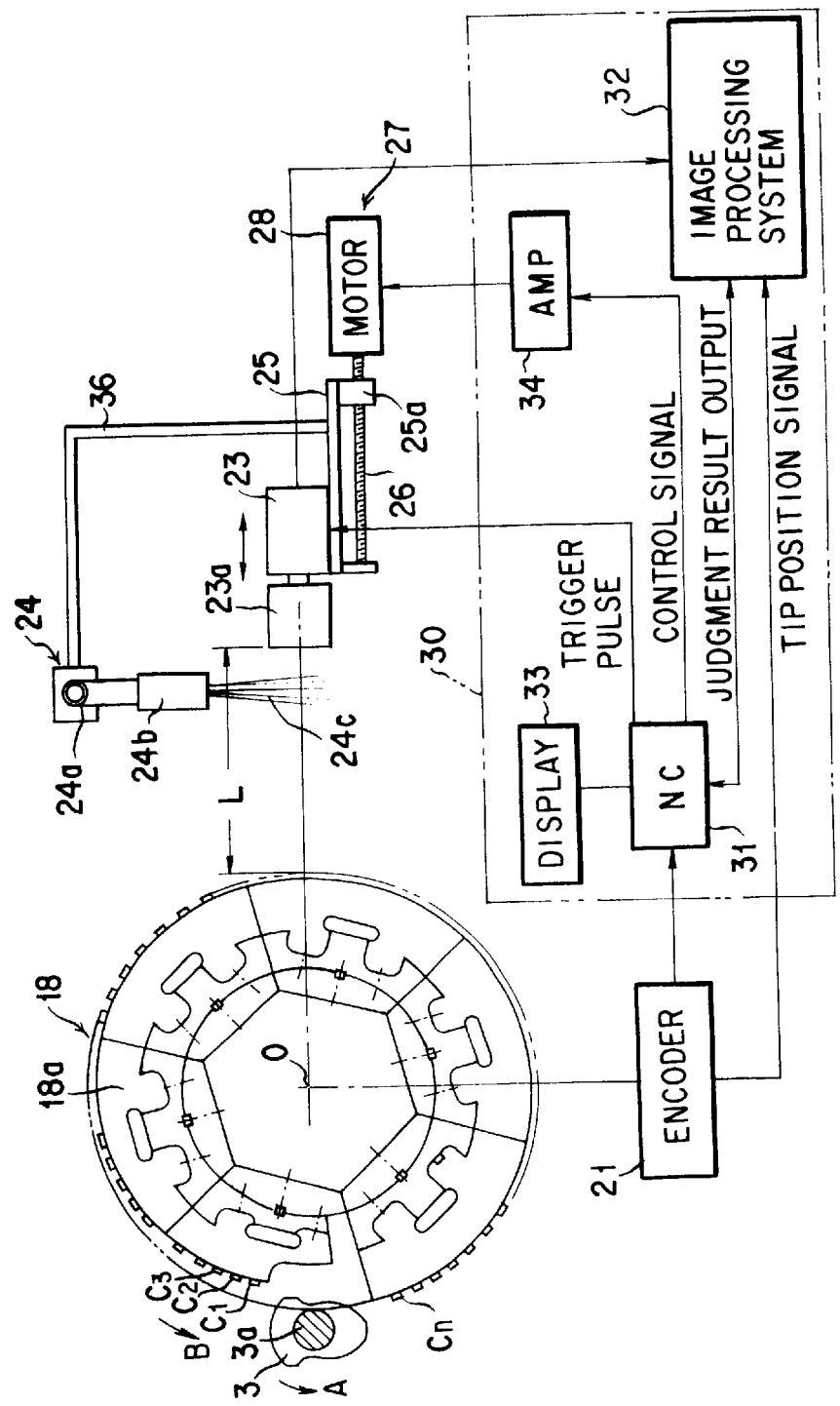
FIG. 4 is a constructional illustration of a tool abnormality detecting system for implementing the shown embodiment of the tool abnormality detecting method for the machine tool of the present invention.
Figure 5:
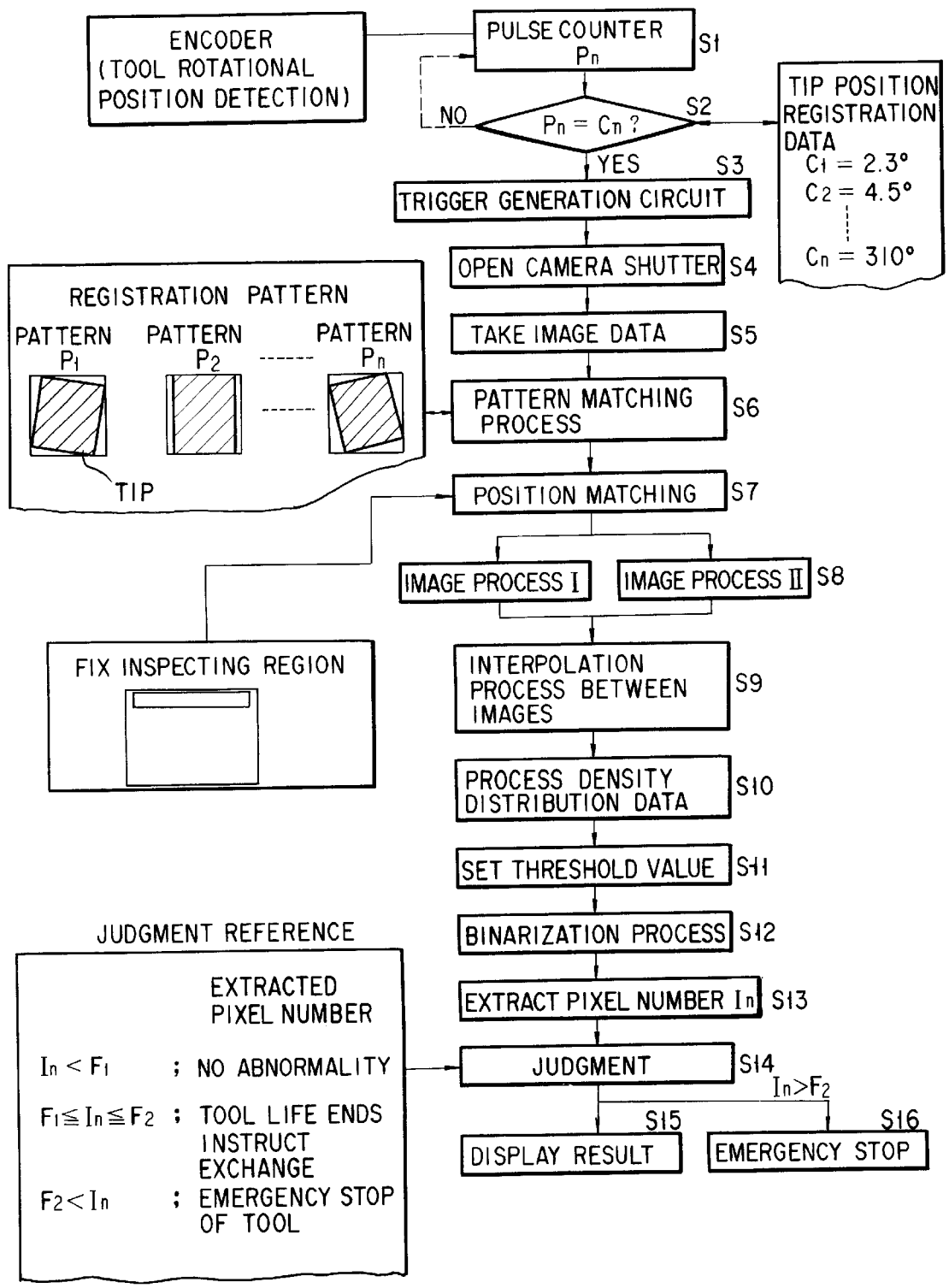
FIG. 5 is a flowchart showing a process of the shown embodiment of the tool abnormality detecting method for the machine tool of the present invention.
Figure 6A:
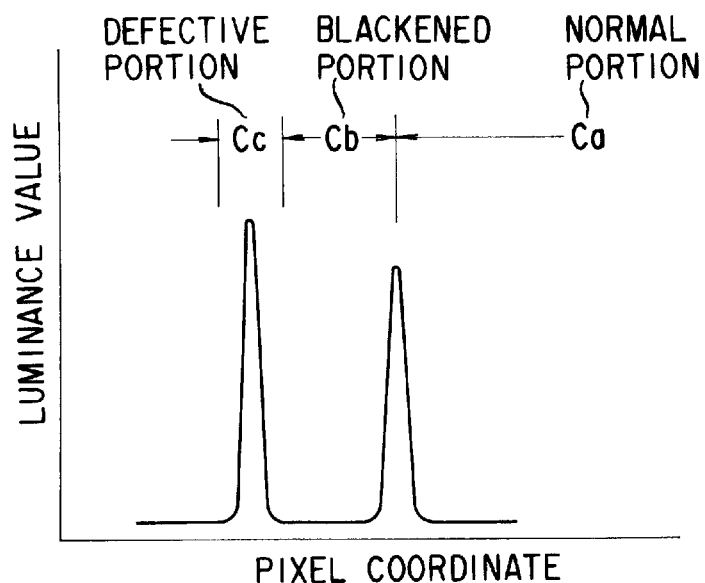
FIGS. 6A and 6B are explanatory illustrations of operation of the shown embodiment of the tool abnormality detecting method for the machine tool of the present invention.
Figure 7:
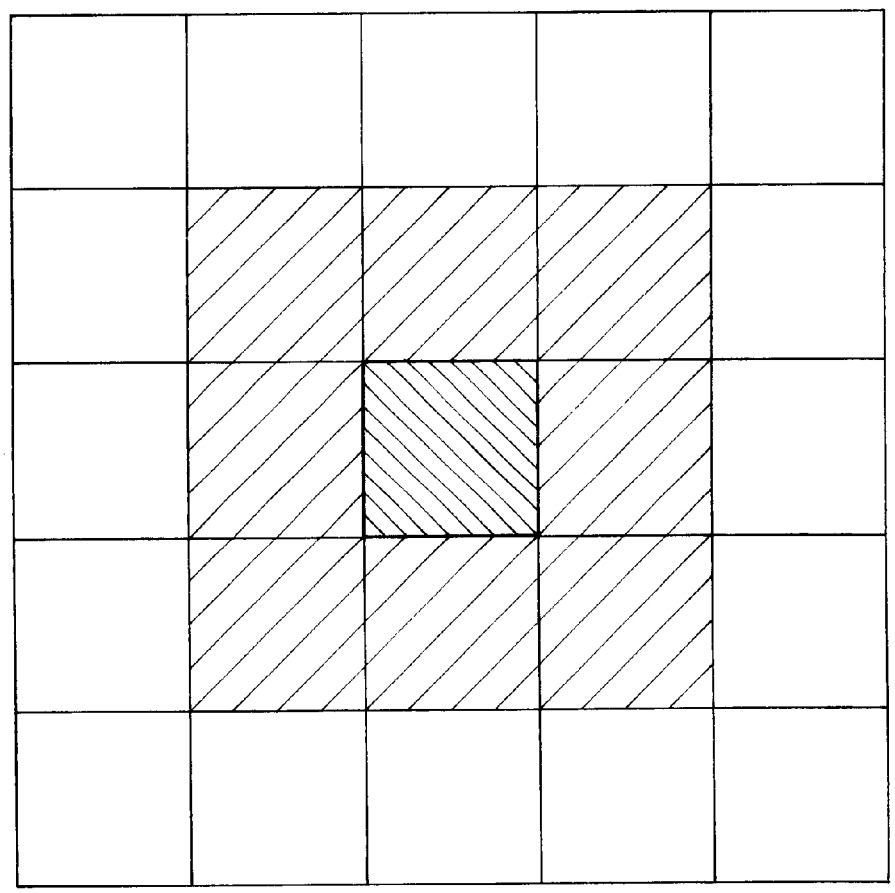
FIG. 7 is an explanatory illustration of operation of the shown embodiment of the tool abnormality detecting method for the machine tool of the present invention.
Figure 8:
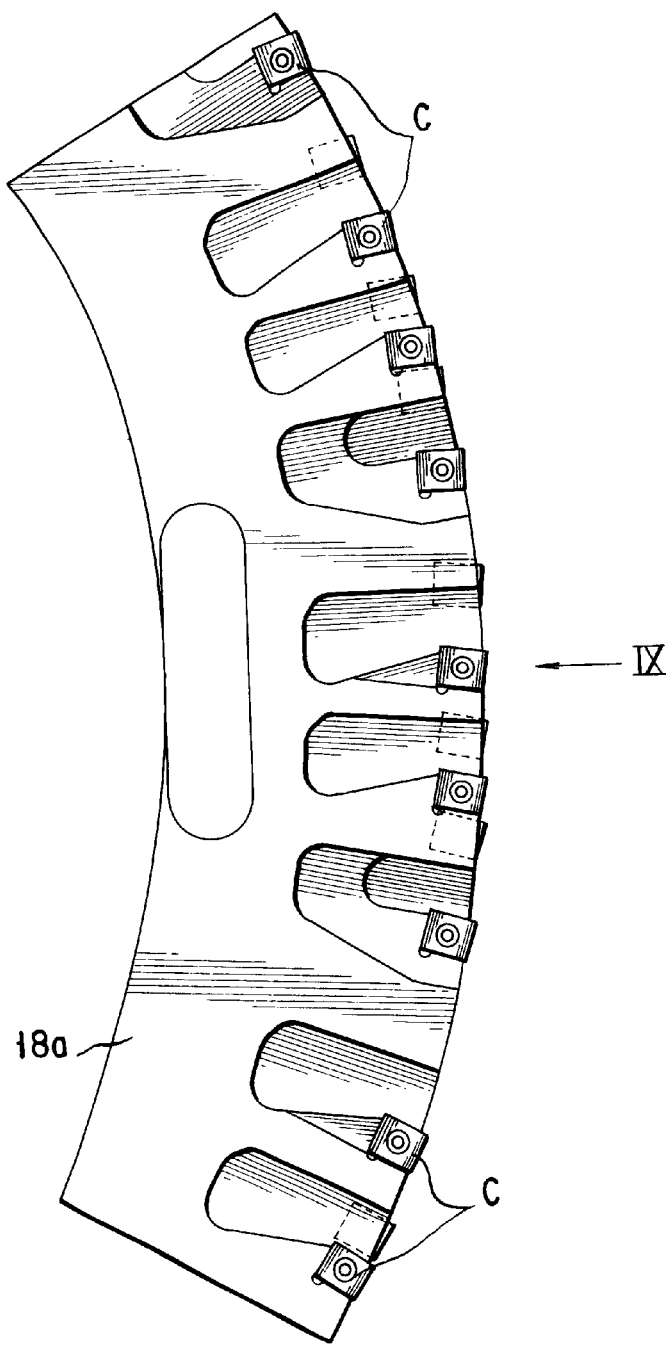
FIG. 8 is a side elevation showing a segment of the tool used in the shown embodiment of the machine tool according to the invention.
Figure 9:
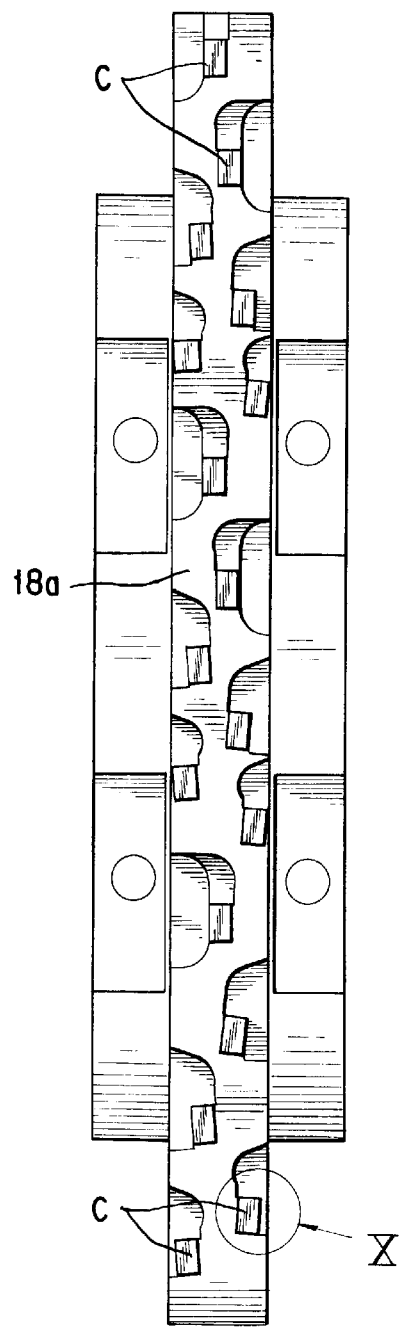
FIG. 9 is an illustration as viewed along a direction of arrow IX of FIG. 8.
Figure 10:
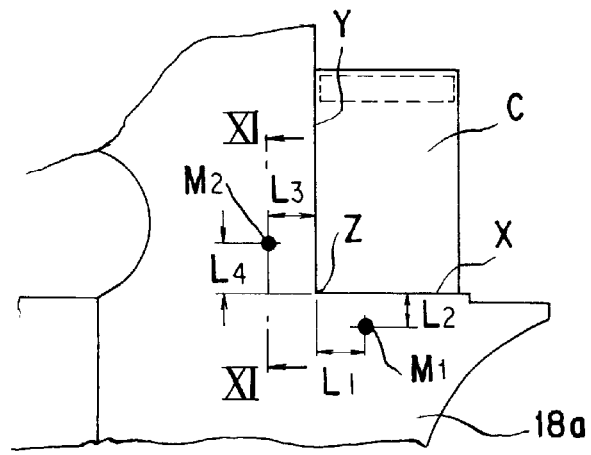
FIG. 10 is an enlarged illustration in a circle X of FIG. 9.
Figure 11:
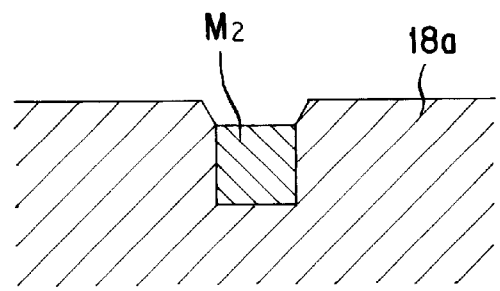
FIG. 11 is a section taken along line XI—XI of FIG. 10.

An embodiment implementing a tool abnormality detecting method according to the present invention to a machine tool, such as a turn broach, will be discussed in detail with reference to FIG. 2 and subsequent drawings. FIG. 2 is a side elevation of a turn broach provided with a tool abnormality detecting system implementing a method according to the invention, FIG. 3 is a plan view of the same, FIG. 4 is a constructional illustration showing the tool abnormality detecting system for a machine tool, FIGS. 5, 6 and 7 are explanatory illustration of operation, FIG. 8 is a side elevation of a segment forming a turn broach cutter, FIG. 9 is an illustration as viewed along a direction of arrow IX, FIG. 10 is an enlarged illustration in a circuit X of FIG. 9, FIG. 11 is an enlarged section taken along line XI—XI of FIG. 10, and FIG. 12 and subsequent figure are explanatory illustrations of operation.

Figure 3:
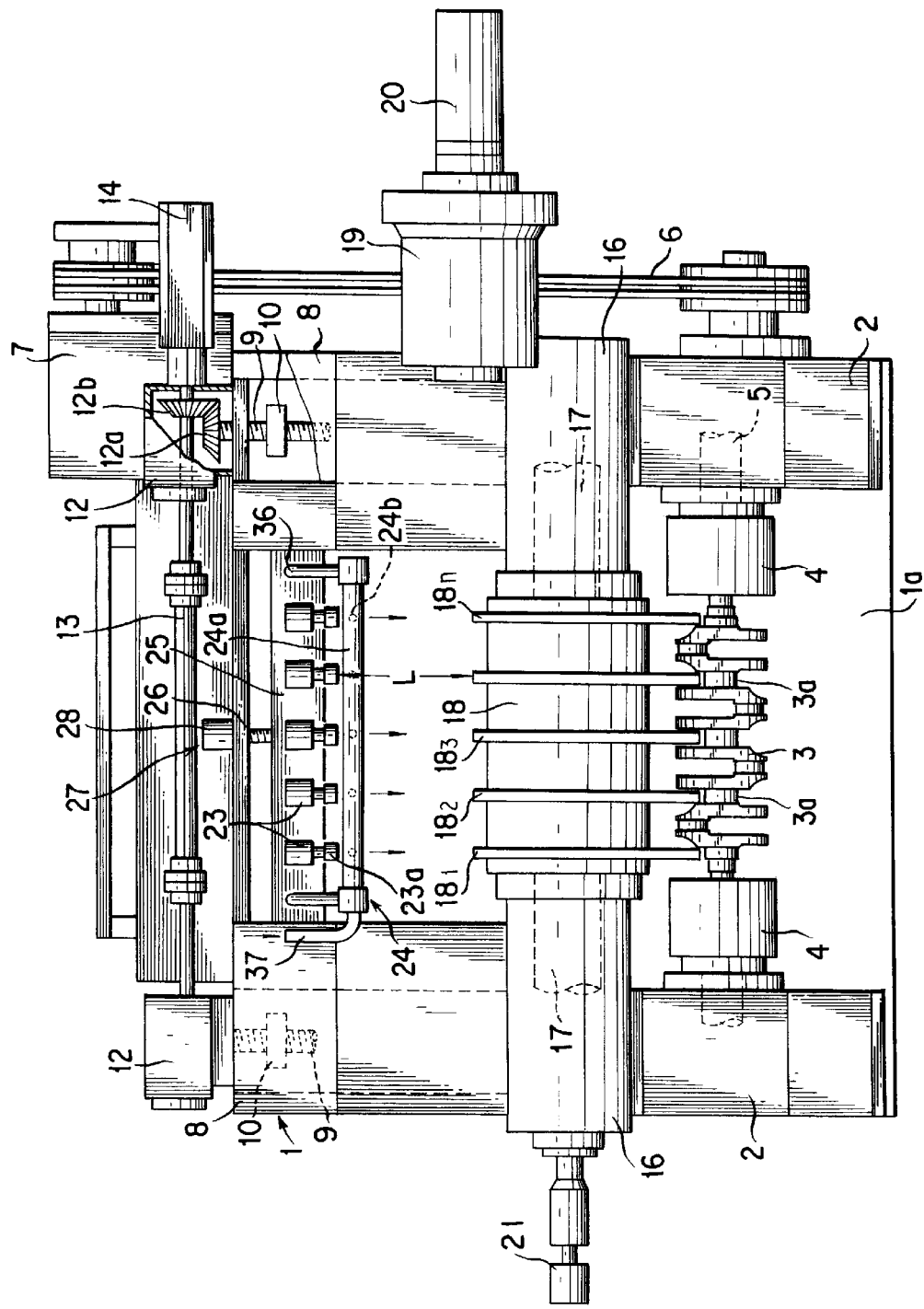
FIG. 3 is a partly cut-out top plan view of the machine tool employing the preferred embodiment of a tool abnormality detecting method according to the present invention.

In FIGS. 2 and 3, the reference numeral 1 denotes a main body of a turn broach, in which a laterally spaced pair of work heads 2 are provided on a bed 1a.

On the opposite surface of the work head 2, chucks 4 gripping both ends of the work 3 to be machined, are provided. In conjunction therewith, an end portion of a main shaft 5 on which the chucks 4 are mounted, is connected to a work driving motor 7 via an endless belt 6 for rotating the work 3 in a direction of arrow A of FIG. 2 via the main shaft 5 and the chucks 4 by the work driving motor 7.

On the other hand, on the foregoing bed 1a, a pair of slides 8 movable in a direction perpendicular to a longitudinal direction of the work 3 are provided in laterally spaced apart position.

On the lower side of the slides 8, feeding threaded shafts 9 consisted of ball screws are rotatably provided in a direction parallel to motion direction. To these feeding threaded shafts 9, nut members 10 provided on the lower surfaces of respective slides 8 are threadingly engaged.

On the rear side ends of respective feeding threaded shafts 9, bevel gears 12a in bevel gear boxes 12 mounted on rear surfaces of the bed 1a are fixed.

In each bevel gear box 12, a drive shaft 13 is extended in a direction perpendicular to the feeding threaded shaft 9. A bevel gear 12b fixed to the drive shaft 13 is meshed with the foregoing bevel gear 12a, and a slide driving motor 14 is connected to one end of the drive shaft 13. By rotating the feeding threaded shaft 9 via the drive shaft 13, the bevel gears 12b and 12a by the slide driving motor 14, left and right slides 8 are synchronized to move toward and away from the work head 2.

On the upper surfaces of respective slides 8, cutter heads 16 are provided, respectively.

Within each cutter head 16, a rotary shaft 17 is rotatably supported in a direction parallel to the main shaft 5 of the work head 2. Between mutually opposing end portions of the rotary shafts 17, drum form broach cutters 18 are detachably mounted.

On the other hand, on the other end of one rotary shaft 17, a broach cutter driving motor 20 is connected via a reduction gear 19. Upon machining of the work, the broach cutter 18 is rotated for substantially one turn in a direction of arrow B of FIG. 2 by the broach cutter driving motor 20. On the other end of the other rotary shaft 17, a rotation angle detecting means 21, such as an encoder, detecting a rotation angle of the rotary shaft 17 is connected.

On the other hand, the broach cutter 18 has a construction, in which a plurality of segments 18a divided in a circumferential direction are coupled in a plurality of rows in an axial direction. Outer peripheries of respective segments 18a are formed into an eccentric structure when enlarging diameters with respect to a rotation center O in sequential order.

Then, sequentially from the outer peripheral surface of the segment 18a having the smallest outer diameter, a plurality of rough machining tips C1, C2, C3 . . . are arranged in lattice fashion as shown in FIG. 9 and detachably mounted on the segments 18a. Also, according to increasing of outer diameters of the segments 18a, semi-finishing tips, finishing tips . . . Cn are mounted in sequential order. During substantially one turn of the broach cutter 18, rough machining to finishing machining of the work 3 can be performed.

On the other hand, in the vicinity of respective tips C1, C2, . . . Cn at least one reference marker M is provided.

FIG. 10 shows an example where reference markers M1 and M2 are provided at two positions in the vicinity of the tips C. One reference marker M1 is provided on the lower side position of the tip C located at a distance L1 in lateral direction and a distance L2 in vertical direction with respect to an intersection Z of tip mounting reference planes X and Y. The other reference marker M2 is provided on the side portion of the tip C located at a distance L3 in the lateral direction and a distance L4 in the vertical direction with respect to the intersection Z of the tip mounting reference planes X and Y.

Then, these reference markers M1 and M2 are located at a reentrant position from the surface of the segment 18a as shown in FIG. 11 in order to prevent erasure or injury by chip and so forth generated during cutting work to be impossible to recognize.

It should be noted that while the reference markers M1 and M2 are circular in the embodiment of FIG. 10, it would be sufficient to provide at one position when a directionality is identified by the shape, such as triangular shape, quadrangular shape or so forth.

On the other hand, a reference marker cleaning means, such as an air blower, may be provided in the vicinity of a position where the reference markers M1 and M2 pass, in order to clean up the reference markers M1 and M2.

On the opposite side of the work 3 across the broach cutter 18, an image pick-up means 23 and an air-curtain forming means 24 are provided.

The image pick-up means 23 is constructed with a CCD camera, for example. A plurality of image pick-up means 23 are fixed on a mounting base 25 for each of tip rows $18_1$, $18_2$, . . . $18_n$ of the broach cutter 18, as shown in FIG. 3.

Images of each tip C1, C2, ... Cn of each tip row $18_1$, $18_2$, ... $18_n$ picked-up by the image pick-up means 23 are input to an image processing system 32 of a control means 30 which will be discussed later.

The tips C1, C2, ... Cn provided on the outer periphery of the broach cutter 18 are eccentrically arranged so as to be sequentially increased in diameter with respect to the rotation center O of the broach cutter 18 from the rough machining chip to the finishing chip, as set forth above.

Therefore, by preliminarily concentrating focal points of lens 23a of the image pick-up means 23 to the rough machining tips C1, C2, ..., missing of a point is caused in the lens 23a of the image pick-up means 23 associated with rotation of the broach cutter 18 to make it impossible to obtain a clear image.

In the embodiment of the present invention, a focus adjusting means 27 is provided for moving the mounting base 25 in a direction toward and away from the broach cutter 18 in synchronism with rotation of the broach cutter 18 to maintain the distance L from each tip C1, C2, ... Cn to the lens 23a of the image pick-up means 23 to be always constant, in order to avoid the drawbacks set forth above.

Namely, the foregoing focus adjusting means 27 includes the mounting base 25 extending transversely between respective slides 8, 8 and movable toward and away from the broach cutter 18. On the lower side of the mounting base 25, a feeding threaded shaft 26 formed with a ball screw is rotatably supported in the motion direction of the mounting base 25.

To the feeding threaded shaft 26, a nut member 25a provided on the bottom portion of the mounting base 25 is threadingly engaged. On one end side of the feeding threaded shaft 26, a focus adjusting motor 28 mounted on the rear surface of the bed 1a is connected. By rotating the feeding threaded shaft 26 by the focus adjusting motor 28, the mounting base 25 can be moved toward and away from the broach cutter 18.

Then, the focus adjusting motor 28 is controlled by the control means 30.

The foregoing control means 30 includes an NC system 31 controlling the turn broach and the image processing system 32 performing image processing of the image picked-up by the image pick-up means 23. In the image processing system 32, tip registration patterns P1, P2, ... Pn of various orientations and shapes are preliminarily stored. By performing pattern matching processing of the tip registration patterns P1, P2, ... Pn and each tip C1, C2, ... Cn picked-up by the image pick-up means 23, the tip position matching with the tip registration patterns P1, P2, ... Pn is detected. Furthermore, by performing binarizing processing by setting a threshold value on the basis of a density distribution in the inspection region set on the edge portion, which will be discussed later, abnormality of each tip C1, C2, ... Cn is judged. A result of judgment is output to the NC system 31 to be displayed in a display means 33 of the NC system 31 and to cause emergency stop of the turn broach as required.

On the other hand, to the NC system 31, a signal from the rotation angle detecting means 21 detecting the rotation angle of the broach cutter 18 is also input. On the basis of the signal from the rotation angle detecting means 21, a control signal is output to the focus adjusting motor 28 via an amplifier 34 to control the focus adjusting motor 28 for maintaining the distance L from each tip C1, C2, ... Cn to the lens 23a of the image pick-up means 23 to be always constant.

On the other hand, the foregoing air-curtain forming means 24 includes a header 24a transversely extended between tip ends of a pair of substantially reversed L-shaped support members 36 extended from the upper surface of the mounting base 25.

On the lower surface of the foregoing header 24a, a nozzle 24b is provided for each image pick-up means 23. An air is jetted upwardly from the nozzle 24b in front of the lens 23a of the image pick-up means 23. Also, on one end side of the foregoing header 24a, a not shown air supply source is connected via an air supply tube 37.

Next, a tool abnormality detecting method by the tool abnormality detecting system for the machine tool constructed as set forth above, will be explained with reference to a flowchart shown in FIG. 5 together with explanatory illustrations of operation shown in FIGS. 6 and 7.

The work 3 to be machined by the broach cutter 18 is gripped at both ends by respective chucks 4 of the work head 2 and is rotated in the direction of arrow A of FIG. 2 by the work driving motor 7.

The broach cutter 18 is set between the rotary shafts 17 of the respective cutter heads 8 and rotated over substantially one turn in the direction of arrow B of FIG. 2 by the broach cutter driving motor 20 for respective journals 3a of the work 3 are machined simultaneously by a plurality of tip rows $18_1$, $18_2$, ... $18_n$ provided on the outer peripheral surface of the broach cutter 18.

On the other hand, associating with initiation of machining of the work 3, the rotation angle of the broach cutter 18 is detected by the rotation angle detecting means 21. By the rotation angle detecting means 21, a pulse signal is input to the NC system 31.

The NC system 31 counts the pulse signals input from the rotation angle detecting means 21 at step S1 of FIG. 5 and compares the preliminarily registered tip position registration data Cn and the counted value Pn at step S2.

The tip position registration data is preliminarily registered the positions of the tips C1, C2, ... Cn which are different per the broach cutter 18, for each broach cutter 18. The tip position registration data of the broach cutter 18 currently used for machining is read out and is compared with the counted value Pn.

For example, in case of this embodiment, the first tip C1 is set at 2.3°, the second tip C2 is set at 4.5° and the final tip Cn is set at 310°.

When the counted value Pn is consistent with the position registration data C1 of the first tip C1 at step S2, a trigger pulse is output to the image pick-up means 23 by the trigger generating circuit at step S3, and a shutter of the image pick-up means 23 is opened to pick-up the image of the first tip C1 at step S4.

The image of the first tip C1 picked-up by the image pick-up means 23 is taken in the image processing system 32 at step S5, and then image processing is performed at step S6.

The image processing may comprise pattern matching processing of the tip registration patterns P1, P2, ... Pn preliminarily registered and the image of the first tip C1 taken in the image processing system 32, at step S6.

The tip registration patterns P1, P2, ... Pn are images of respective tips C1, C2, ... Cn of various orientation and configuration preliminarily registered as patterns. By performing pattern matching processing among the registered tip registration patterns P1, P2, ... Pn, the tip registration pattern P1, P2, ... Pn matching with the image of the first tip C1 picked-up by the image pick-up means 23, is selected.

Then, at step S7, position matching between the selected tip registration pattern P1, P2, . . . Pn and the image of the first tip C1 and setting of the inspection region are performed.

Setting of the inspection region is performed by setting the tip end region of the normal tip C1, C2, . . . Cn since chipping or wearing of the tip C1, C2, . . . Cn caused by machining of the work 3 is concentrated to the tip end of the tip C1, C2, . . . Cn. At this time, even when the inspecting region is oxidized and blackened due to heat generated during cutting, offset of the inspecting region will never be caused since positioning is performed with reference to the reference markers M1 and M2.

When setting of the inspection region is completed at step S7, after density distribution data processing of the set inspection region is performed, the threshold value is derived from the basis of the obtained density distribution data to perform binarization with reference to the threshold value to perform abnormality judgment. In the conventional method as set forth above, if the normal portion Ca and the blackened portion Cb are present in the inspection region in the admixed fashion, since the defective portion Cc caused in the blackened portion Cb becomes substantially the same luminance value to cause difficulty in detection of abnormality.

Therefore, in the invention, two different image processings are performed at step S8 of FIG. 5 to take out only luminance value of the defective portion Cc and thus to make judgment of abnormality based on the obtained luminance value.

Figure 1A:
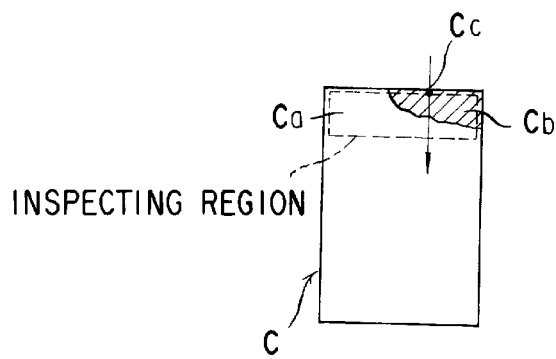
FIGS. 1A and 1B are explanatory illustrations for explaining drawbacks in the conventional image process.
Figure 1B:
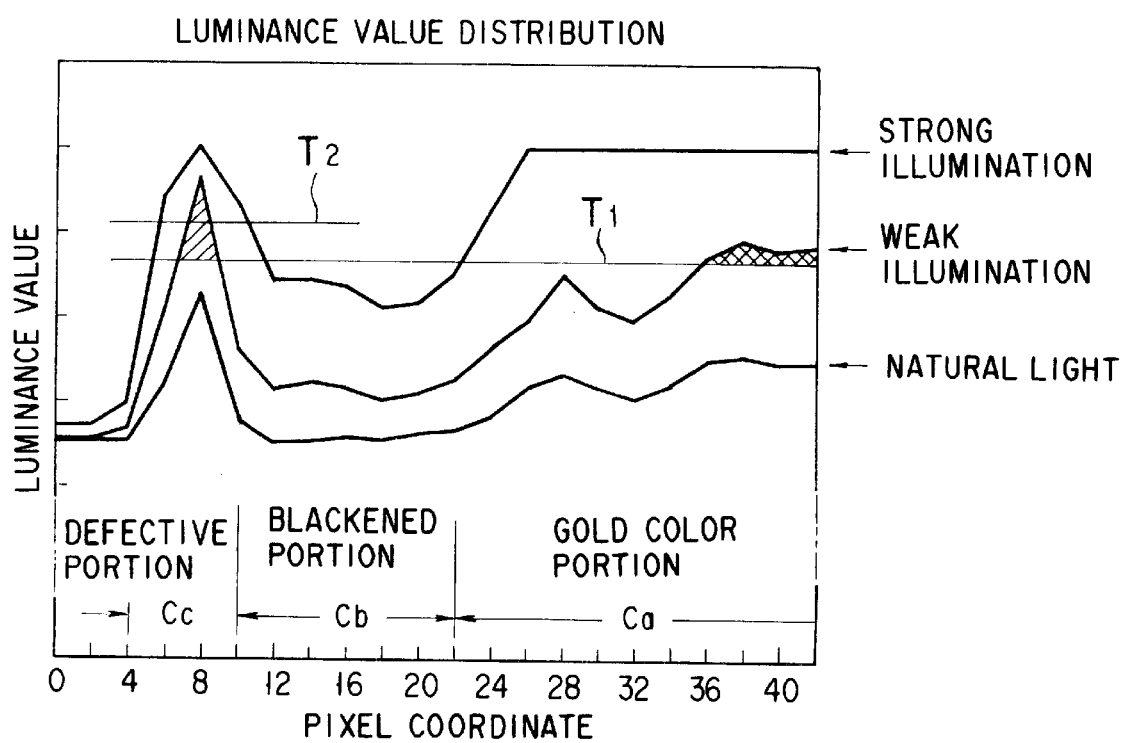

Namely, in peripheral portion of the defective portion Cc, such as chipping of the edge occurring at the cutting edge of the tip C, the density (luminance value) distribution varies quickly as shown in FIG. 1B, whereas the distribution varies relatively moderately between the normal portion Ca and the blackened portion Cb.

Using this, the luminance values obtained by different image processes, are interpolated between images to make the luminance values of the normal portion Ca and the blackened portion Cb substantially zero to take out only luminance value of the defective portion Cc.

Namely, when position matching of the tip registration pattern P1 and the first tip C1 and setting of the inspection region at step S7 of the flowchart shown in FIG. 5 are completed, different image process I and image process II are executed at step S8.

One I of the different image processes I and II may comprise primary differentiation processing of the image of the inspection region, for example. Thus, as shown in FIG. 6A, the luminance value of the portion where quick density variation is caused remains.

On the other hand, the other image process II may, for example, comprise replacing the image of the inspection region into an average value of adjacent eight pixels as shown in FIG. 7 by averaging processing. On the basis of the luminance value distribution obtained by these image processes I and II, an interpolation between the images is performed at step S9.

Figure 6B:
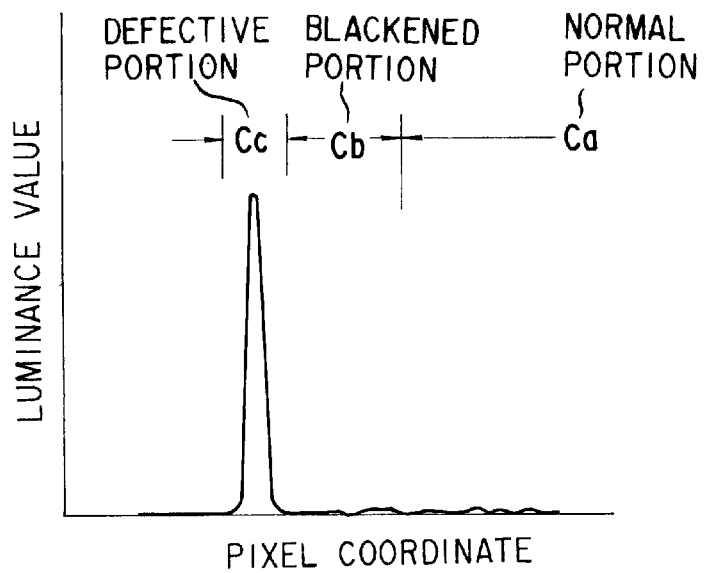

By this, as shown in FIG. 6B, the luminance values of the normal portion Ca and the blackened portion Cb become substantially zero and only the luminance value of the defective portion Cc can be taken out.

After density distribution data processing of the obtained luminance value distribution data at step 10, the threshold value is set at step S11 to perform binarizing processing with reference to the threshold value at step S12.

Then, at step S13, number of pixels In is extracted from the binarized density distribution data. The number of pixels In and a preliminarily registered judgment criterion are compared at step S14 to perform an abnormality judgment.

The preliminarily registered judgment criterion is to compare the preliminarily set reference values F1 and F2 and the extracted pixel number In and to make judgment of normal and abnormal with the next reference.

In<F1: not abnormal (normal), F1≦In≦F2: life of tool ends and exchange instructed, F2<In: tool abnormal, machine emergency stop A result of judgment at step S14 is fed to the NC system 31 at step S15 to be displayed on the display means 33 of the NC system 31. In conjunction therewith, in case of F2<In, judgment is made that abnormality is caused in the tool to cause emergency stop of the turn broach at step S16.

On the other hand, the operation of the tool abnormality detecting system for the machine tool will be discussed with reference to a flowchart shown in FIG. 13 together with a pattern matching process screen shown in FIG. 12.

The work 3 machined by the broach cutter 18 is gripped the both ends by respective chucks 4 of the work head 2, and rotated in the direction of arrow A of FIG. 2 by the work driving motor 7.

On the other hand, the broach cutter 18 is set between the rotary shafts 17 of the respective cutter heads 8 to be rotated about one turn in the direction of arrow B of FIG. 2 by the broach cutter driving motor 20. With a plurality of tip rows $18_1, 18_2, \ldots 18_n$ provided on the outer peripheral surface of the broach cutter 18, the respective journals 3a of the work 3 are machined simultaneously.

On the other hand, upon initiation of machining of the work 3, the rotation angle of the broach cutter 18 is detected by the rotation angle detecting means 21. The pulse signal is thus input to the NC system 31 by the rotation angle detecting means 21.

Figure 13:
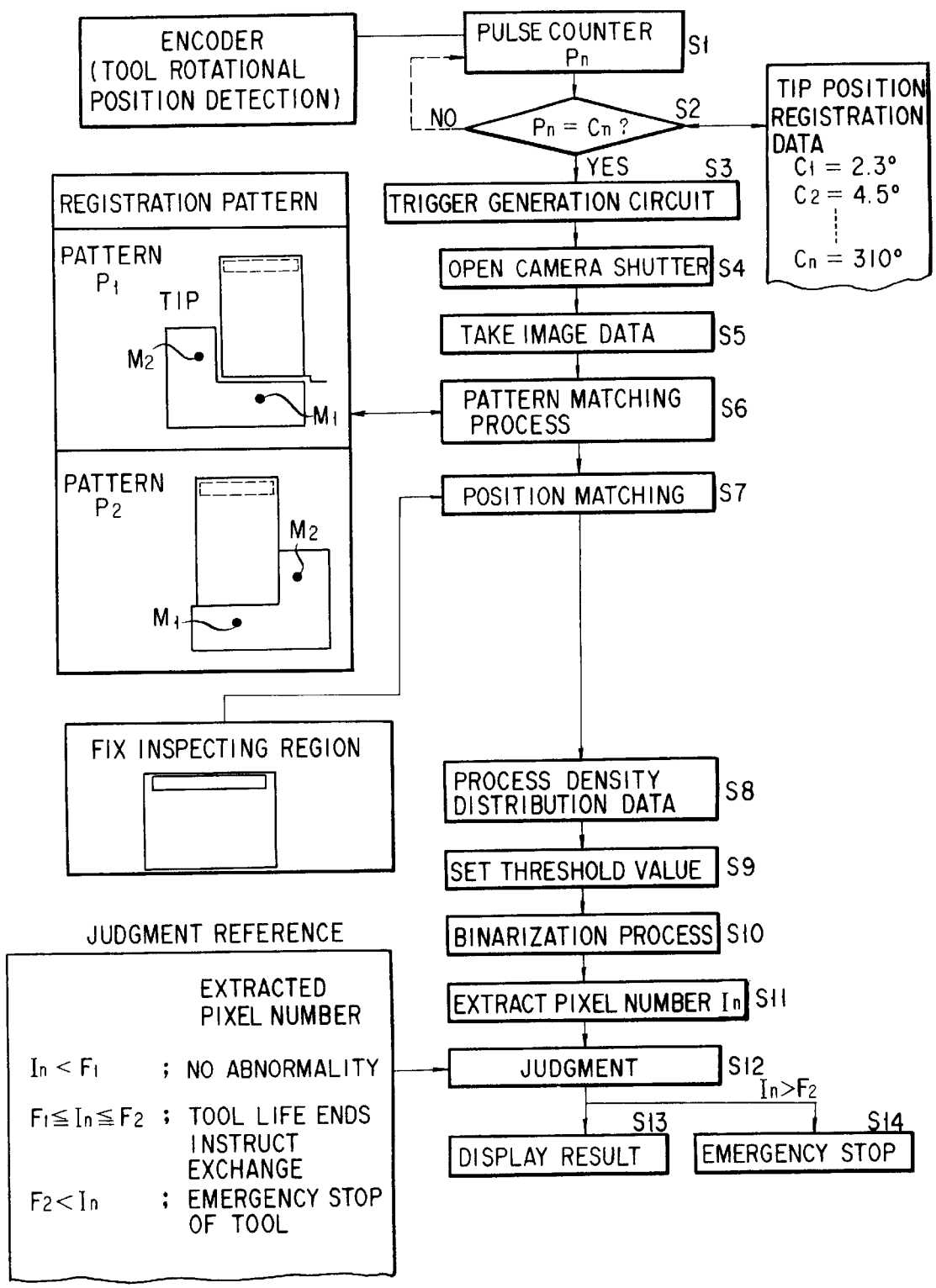
FIG. 13 is a flowchart showing operation of the shown embodiment of the tool abnormality detecting system according to the invention.

At step S1 of FIG. 13, the NC system 31 counts the pulse signals input from the rotation angle detecting means 21 to compare the preliminarily registered tip position registration data Cn and the counted value Pn at step S2.

The tip position registration data represent positions of the tips C1, C2, . . . Cn which are different per the broach cutter 18, preliminarily stored with respect to each broach cutter 18. The tip position registration data of the broach cutter 18 which is currently on use for machining, is read out to be compared with the counted value Pn.

For example, in case of the shown embodiment, the first tip C1 is set at 2.3°, the second tip C2 is set at 4.5° and the final tip Cn is set at 310°.

When the counted value Pn is matched with the position registration data C1 of the first tip C1 at step S2, a trigger pulse is output to the image pick-up means 23 by the trigger generating circuit at step S3 to open the shutter of the image pick-up means 23 at step S4 to pick-up the image of the first tip C1.

The image of the first tip C1 picked-up by the image pick-up means 23 is taken in the image processing system at step S5, and thereafter image processing is performed at step S6.

The image processing is performed by pattern matching processing of the preliminarily registered tip registration patterns P1, P2, . . . Pn and the image of the first tip C1 taken in the image processing system 32, at first, at step S6. If the pattern matching processing is performed by taking the image per se of the tip C1 taken in the image processing system 32 as the pattern, the following drawbacks should be encountered.

Figure 12A:
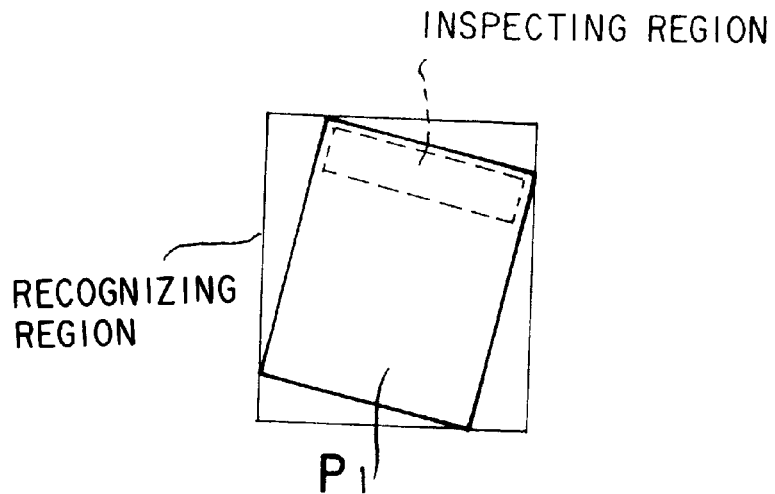
FIGS. 12A and 12B are explanatory illustrations of operation of the shown embodiment of the tool abnormality detecting system for the machine tool according to the invention.
Figure 12B:
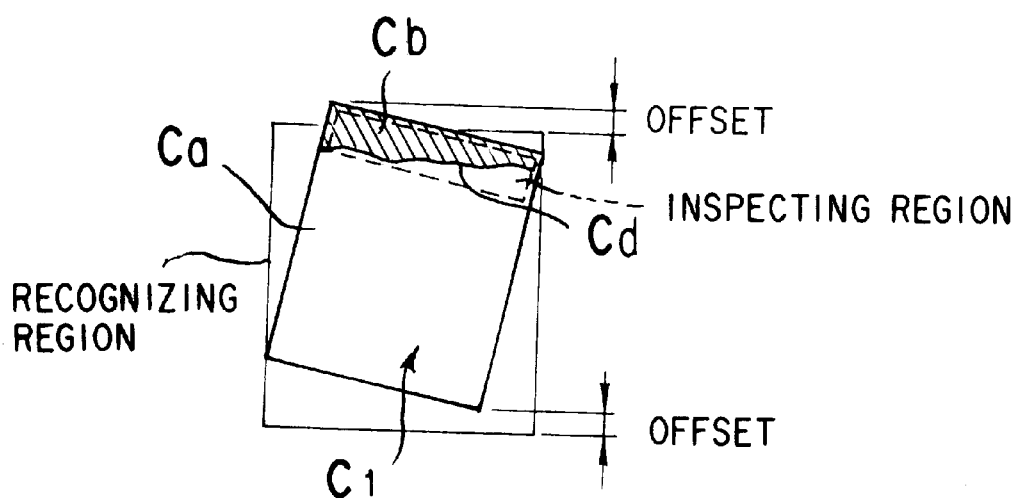

Namely, since the tip registration pattern P1 of the tip C1 preliminarily registered in the image processing system 32 is oxidized and blackened the cutting edge portion by the heat generated during cutting work in relation to FIG. 12A, the image of the actual tip C1 picked-up by the image pick-up means 23 becomes the pattern shown in FIG. 12B. Then, the registered pattern and the actual image are compared to the pattern matching process (normalizing correlating operation). Upon recognition of the position at which the tip is located, it is possible that a boundary Cd between the blackened portion Cb and the non-blackened portion Ca of the tip C1 can be erroneously recognized as edge of the tip C1.

As a result, displacement is caused in the position of the inspection region of the cutting edge portion to be inspected as shown in FIG. 12B to encounter the drawback in that normal inspection cannot be performed.

In order to prevent such drawback, a method that a plurality of kinds of generation patterns of the blackened portion Cb are preliminarily registered and pattern matching processing with these patterns is performed, can be taken. However, in this method, when the number of registration patterns become large, a large amount of time is required for matching processing to cause a difficulty in processing within a period assigned for inspection of one tip, and thus is not practical.

In order to solve such drawback, the present invention preliminarily takes the image of the tip C1, C2, ... Cn and, in conjunction therewith, the reference markers M1 and M2 provided in the vicinity of the tip C1, C2, ... Cn to register the pattern. Upon pattern matching processing, pattern matching of the register pattern and the image of the tip taken by the image pick-up means 23 is performed for achieving recognition of the tip position.

Namely, the images of tip C1 and the reference markers M1 and M2 taken in the image processing system 32 by the image pick-up means 23 at step S5 are subject to pattern matching with the preliminarily registered tip registration pattern P1, P2, ... Pn at step S6. On the basis of the positions of the tip registration pattern P1, P2, ... Pn and the reference markers M1 and M2, the tip registration pattern P1 matching with the image of the first tip C1 picked-up by the image pick-up means 23 is selected.

Then, at step S7, by position matching of the reference markers M1 and M2 of the selected tip registration pattern P1 and the reference markers M1 and M2 of the first tip C1, the inspection region can be accurately set.

Setting of the inspection region is performed by setting the tip end region of the normal tip C1, C2, ... Cn, since chipping or wearing of the tip C1, C2, ... Cn caused by machining of the work 3 is concentrated to the tip end of the tip C1, C2, ... Cn. In conjunction therewith, even if the inspecting region is oxidized and blackened by the heat generated during cutting, since position matching is performed with reference to the reference markers M1 and M2, displacement of the inspecting region may not be occur.

When setting of the inspecting region is completed at step S7, the process is advanced to step SB to perform density distribution data processing of the set inspecting region.

Thereafter, the threshold value is set at step S9, and binarization processing is performed with reference to the threshold value at step S10 to binarize the density distribution data.

Then, at step S10, number of pixels In is extracted from the binarized density distribution data. The number of pixel In and the preliminarily registered judgment criterion are compared at step S11 to perform an abnormality judgment.

The preliminarily registered judgment criterion is to compare the preliminarily set reference values F1 and F2 and the extracted pixel number In and to make judgment of normal and abnormal with the next reference.

In<F1: not abnormal (normal), $F1 \leq In \leq F2$: life of tool ends and exchange instructed, F2<In: tool abnormal, machine emergency stop.

A result of judgment at step S12 is fed to the NC system 31 at step S13 to be displayed on the display means 33 of the NC system 31. In conjunction therewith, in case of F2<In, judgment is made that abnormality is caused in the tool to cause emergency stop of the turn broach at step S14.

On the other hand, in conjunction with the foregoing process, the NC system 31 outputs the control signal depending upon the rotation angle of the broach cutter 18 input from the rotation angle detecting means 21, to the focus adjusting motor 28 via the amplifier 34.

The focus adjusting motor 28 moves the mounting base 25 frontwardly by rotating the feeding threaded shaft 26 by the control signal input from the NC system 31 for controlling the distance L from respective tip C1, C2, ... Cn of the rotated broach cutter 18 to the lens 23a of the image pick-up means 23 to be always constant.

By this, even when respective tips C1, C2, ... Cn on the outer peripheral surface of the broach cutter 18 are located eccentrically with respect to a rotation center O, the focus point of the image pick-up means 23 will never offset to permit constant pick-up of clear images of respective tips C1, C2, ... Cn.

On the other hand, during machining of the work 3, by the air jetted by the nozzle 24b of the air curtain forming means 24, an air curtain 24c is formed in front of the lens 23a of the image pick-up means 23. Therefore, a chip, smoke, a splash of a cutting lubricant and so forth will never be deposited on the lens 23a of the image pick-up means 23, so that precise detection of abnormality, such as chipping, caused on the respective tips C1, C2, ... Cn can constantly be performed. Also, since the image pick-up means 23 is located on the opposite side of the cutting position of the work 3 across the broach cutter 18, even when a large chip is created during cutting, the image pick-up means 23 is never damaged by the chip.

It should be noted that while one of the respectively different image processes I and II is a primary differentiation process and the other is an averaging process in the foregoing embodiment, it is also possible to take a maximum value processes as one of the image process and a minimum value process as the other image process, or to take the primary differentiation process as one image process and the minimum value process as the other image process.

On the other hand, while in the foregoing embodiment, the focus adjusting means 27 of the image pick-up means 23 is constructed by threadingly engaging the threaded shaft 26 rotated by the focus adjusting motor 28 with the nut member 25a provided on the mounting base 25 and whereby moving the mounting base 25 toward and away from the broach cutter 18, it is also possible to move the mounting base 25 toward and away from the broach cutter 18 by means of a cam mechanism in place of the feeding threaded shaft 26. Also, by employing the image pick-up means 23 having an automatic focus adjusting mechanism, adjustment of the focal point becomes possible in the condition where the mounting base 25 is fixed and even when the respective tips C1, C2, ... Cn provided on the outer periphery of the broach cutter 18 are arranged eccentrically with respect to the rotation center O of the respective tips C1, C2, ... Cn, and a clear image can be obtained.

Furthermore, while the case implemented on the turn broach has been discussed in the foregoing embodiment, it is a matter of course that the invention is generally applicable to a machine tool employing a tool having a tip.

What is claimed is:

1. A tool abnormality detecting system for a machine tool that performs cutting of a work employing a tool provided with a plurality of throw away tips, said tool abnormality detecting system comprising:

> image pick-up means for picking up an image of at least one of the tips of said tool and at least one of reference markers preliminarily provided in a vicinity of each of the tips of said tool;
>
> means for selecting a corresponding tip pattern among a plurality of preliminarily registered tip registration patterns, each having a pattern reference marker therein, by performing pattern matching processing between the preliminarily registered tip registration patterns and the image of said tip and the reference marker picked up by said image pick-up means;
>
> means for setting an inspecting region in said image of said tip in accordance with a position of the pattern reference marker within the selected tip pattern and the reference marker picked-up by said image pick-up means; and
>
> abnormality detecting means for detecting an abnormality by image processing the inspecting region and making a judgment with respect to a degree of at least one of wearing and chipping.

2. The tool abnormality detecting system according to claim 1, further comprising a cleaning device that cleans materials deposited on said reference markers provided in the vicinity of each of said tips.

3. The tool abnormality detecting system according to claim 1, wherein said reference markers are located at respective reentrant positions from a surface of said tool.

* * * * *